US008763099B2

(12) United States Patent
Ozaki

(10) Patent No.: US 8,763,099 B2
(45) Date of Patent: Jun. 24, 2014

(54) AUTHENTICATION METHOD, INFORMATION PROCESSING APPARATUS, AND STORAGE MEDIUM

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 12/915,587

(22) Filed: Oct. 29, 2010

(65) Prior Publication Data

US 2011/0107396 A1     May 5, 2011

(30) Foreign Application Priority Data

Nov. 2, 2009    (JP) ................................ 2009-252280
Apr. 12, 2010    (JP) ................................ 2010-091574

(51) Int. Cl.
*G06F 15/16*      (2006.01)

(52) U.S. Cl.
USPC ................ 726/7; 726/1; 726/2; 726/3; 726/4; 726/5; 726/6; 726/9; 718/100

(58) Field of Classification Search
USPC .................... 726/1, 9, 2–7; 718/100
See application file for complete search history.

(56) References Cited

U.S. PATENT DOCUMENTS

| 2007/0234400 A1* | 10/2007 | Yanagi | ............................... 726/1 |
| 2008/0115207 A1 | 5/2008 | Go | |
| 2008/0209419 A1* | 8/2008 | Maeda | .......................... 718/100 |

FOREIGN PATENT DOCUMENTS

| CN | 101079089 A | 11/2007 |
| CN | 101105830 A | 1/2008 |
| EP | 1860591 A1 | 11/2007 |
| JP | 10-207661 A | 8/1998 |
| JP | 2005-115749 A | 4/2005 |
| JP | 2008-263331 A | 10/2008 |

OTHER PUBLICATIONS

Kernigham, et al: "The C Programming Langauage, Chapter 5—Pointers and Arrays", The C Programming Language, Prentice Hall, pp. 78-104, XP002614981, 1988.

* cited by examiner

*Primary Examiner* — Thanhnga B Truong
(74) *Attorney, Agent, or Firm* — Canon U.S.A., Inc. IP Division

(57) ABSTRACT

An information processing apparatus acquires user name information contained in user authentication information transmitted from an authentication server. Then, the information processing apparatus describes the acquired user name information according to a predetermined format which the printer driver can refer to, and stores it in a storage area which the printer driver can refer to. The printer driver, if the user name information is stored in the storage area, and the user name information satisfies a condition described in the format, transmits the user name information added to the print data to a printer apparatus.

6 Claims, 14 Drawing Sheets

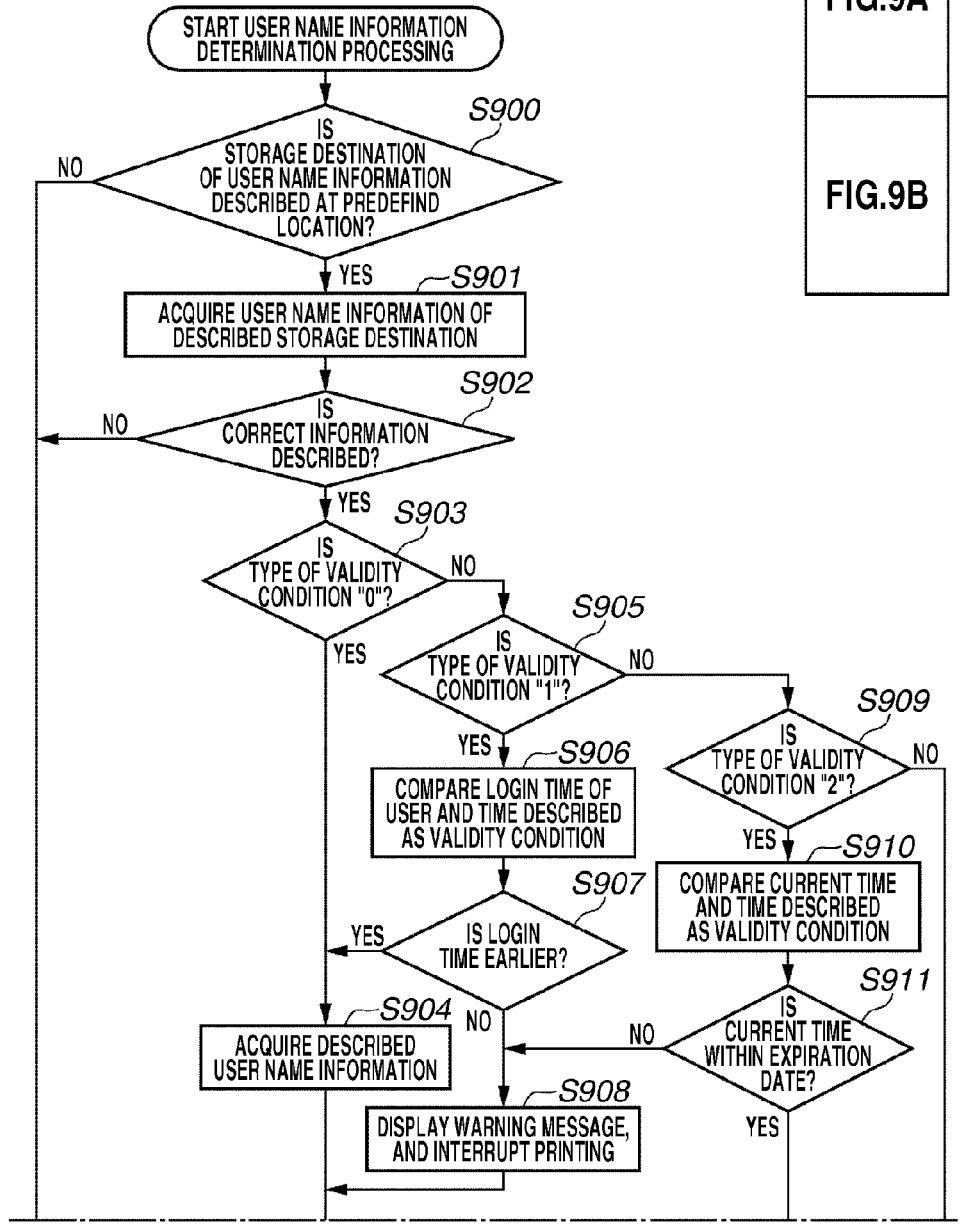

AUTHENTICATION METHOD, INFORMATION PROCESSING APPARATUS, AND STORAGE MEDIUM

BACKGROUND OF THE INVENTION

1. Field of the Invention

The present invention relates to an authentication method, an information processing apparatus, and a storage medium, and more particularly, to the ones suitable when used for adding user information to print data.

2. Description of the Related Art

In recent years, a system for managing users that have performed printing in order to manage security or costs has been desired. For realizing these desires, acquiring user name information for identifying users such as login names of users and computer names, when printing is performed, and adding them to the print data, and managing the users using the user name information have been performed.

To describe more specifically, management of users is performed by extracting, for example, user name information in the printing process, or a user name and a password are input via an operation unit of a printer apparatus, and if these coincide with the user name information added to the print data, then printing is executed.

However, if an authentication system using an integrated circuit (IC) card or the like is used therewith, when printing is executed, it is desired to perform print management based on the user name information other than login names or computer names of a system that the printer driver can acquire automatically from a user interface (UI) setting, an operating system (OS), or the like. In order to realize this, it is necessary to extract user name information from information described in the IC card or the like with the printer driver, and to add the user name information to the print data.

However, an information format that is applied to the IC card or the like varies according to authentication systems. For this reason, it is necessary to provide a printer driver for each authentication system, in order to extract user information to be used for identification of a user from user authentication information.

Although only the user name information authenticated by the authentication system should be captured into the printer driver, it is difficult for the printer driver to acquire the authenticated user name information.

As a technique relating to management of users when printing is performed, there is a technique discussed in Japanese Patent Application Laid-Open No. 10-207661. In the technique discussed in Japanese Patent Application Laid-Open No. 10-207661, first, "user name", "group name" and "password" are set for a printer driver UI by an operation of a user, and these pieces of information are transmitted to the printer apparatus together with the print data. Then, if the information transmitted together with the print data coincides with information registered on the printer apparatus, printing is executed.

However, like the technique discussed in Japanese Patent Application Laid-Open No. 10-207661, with a method in which a user inputs user name information into the printer driver UI, it may be possible to set up information that has not been authenticated by the authentication system.

Further, it is also possible to acquire a login name and a computer name of a user from an OS to use them as user name information, but the user name information to be authenticated by the authentication system such as the IC card or the like does not necessarily coincide with the login name and the computer name acquired from the OS.

Therefore, it is necessary to build a printing system in which, without changing a printer driver, the printer driver can acquire user name information from among user authentication information relating to users authenticated by the authentication system, and can add the user name information to the print data.

SUMMARY OF THE INVENTION

The present invention includes an authentication method and information processing apparatus which enable user information formed using an authentication information used in an authentication system, other than an authentication system compatible with an operating system that performs control of the information processing apparatus, to be added to the print data by the printer driver.

According to an aspect of the present invention, an authentication method of an information processing apparatus includes acquiring authentication information used in an authentication system other than an authentication system compatible with an operating system that controls the information processing apparatus, generating print data using a printer driver, and transmitting user information added to the generated print data, the user information being formed using the acquired authentication information, under control of the printer driver.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
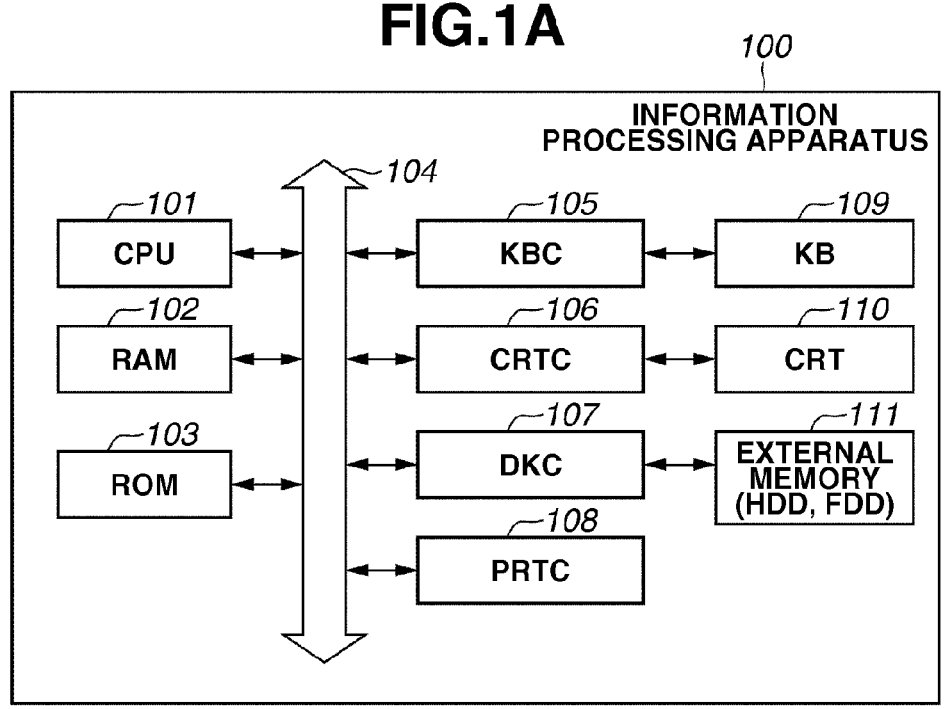
FIGS. 1A and 1B are block diagrams illustrating a configuration of hardware of an apparatus that constitutes a printing system.
Figure 1B:
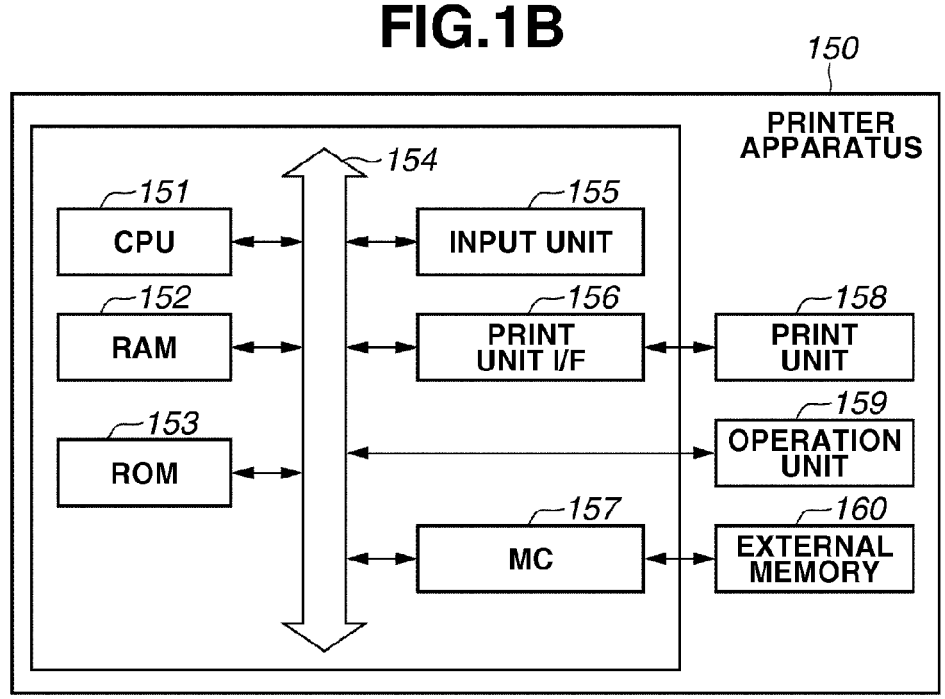

FIGS. 1A and 1B are block diagrams each illustrating an example of configuration of hardware of an apparatus that constitutes a printing system. More specifically, FIG. 1A illustrates an example of configuration of hardware of the information processing apparatus, and FIG. 1B illustrates an example of configuration of hardware of a printer apparatus (printing apparatus). The printing system includes an authentication server and a print server, in addition to the information processing apparatus and the printer apparatus. Since configuration of hardware of the authentication server and the print server can be implemented by the components illustrated in FIG. 1A, and the details thereof will not be repeated.

In FIG. 1 (1A, 1B), an information processing apparatus 100 and a printer apparatus 150 are connected so that they can mutually communicate with each other via a bidirectional interface (e.g., a local area network (LAN), an Internet, a communication cable). Further, the information processing apparatus 100, the authentication server and the print server are also connected so that they can mutually communicate with one another via the bidirectional interface (e.g., the LAN, the Internet, the communication cable).

The information processing apparatus 100 is provided with a central processing unit (CPU) 101 that executes document processing in which graphics, images, characters, tables (including spreadsheets and the like) are mixed, according to a document processing program stored in an external memory 111. The CPU 101 integrally controls respective devices connected to a system bus 104.

The external memory 111 stores therein an operating system program (OS) serving as a control program of the CPU 101, a boot program, various types of application programs, and a printer control command generation program (printer driver).

Further, the external memory 111 also stores therein font data, user files, edition files, and so forth.

A random-access memory (RAM) 102 works as a main memory, a work area, and the like for the CPU 101. A keyboard controller (KBC) 105 controls a key input from a keyboard 109 or a pointing device (not illustrated). A cathode ray tube (CRT) controller (CRTC) 106 controls display of a CRT display (CRT) 110.

A disk controller (DKC) 107 controls access to the external memory 111 such as a hard disk drive (HDD), a flexible disk drive (FDD). A printer controller (PRTC) 108 is connected to the external apparatuses (the printer apparatus 150, the authentication server, the print server) via the bidirectional interface, and executes communication control processing with the external apparatuses.

The CPU 101 executes rasterization processing of outline fonts onto a display information RAM set in the RAM 102, for example, and makes what-you-see-is-what-you-get (WYSIWYG) possible at the CRT 110. Further, the CPU 101 opens various windows registered in advance, and executes various data processing operations, in accordance with commands instructed with a mouse cursor (not illustrated) or the like displayed on the CRT 110.

A user can open a window relating to setting of print, when printing is executed, and can perform setting of print processing parameters to the printer driver including setting of the printer, and selection of print modes.

The printer apparatus 150 performs printing in accordance with print control by a CPU 151. The CPU 151 outputs an image signal serving as output information to a printing unit (printer engine) 158 connected to a system bus 154, in accordance with a control program or the like stored in a read-only memory (ROM) 153, or a control program or the like stored in the external memory 160.

In addition, in the ROM 153, a control program and the like for the CPU 151 are stored. In a font ROM in the ROM 153, font data and the like used at the time of generation of the output information are stored. Further, in a case of a printer apparatus not having the external memory 160 such as hard disks, information and the like utilized in the information processing apparatus 100 is stored in a data ROM in the ROM 153.

The CPU 151 can perform communication processing with the information processing apparatus 100 via an input unit 155, and can notify the information processing apparatus 100 of information in the printer apparatus 150. The RAM 152 is a RAM that works for the CPU 151 as a main memory, a work area, and the like, and is configured in such a manner that memory capacity can be expanded by an optional RAM connected to an expansion port (not illustrated). The RAM 152 is used as an output information rasterization region, an environment data storage area, and a non-volatile RAM (NVRAM).

Access to the external memory 160 including the hard disk drive (HDD), the IC card, and the like is controlled by a memory controller (MC) 157. The external memory 160 stores therein font data, an emulation program, form data, and the like, in addition to the above-described control programs. Further, switches and a light emitting diode (LED) indicator for operation of the printer apparatus 150 are disposed on an operation unit 159.

A plurality of memories may be connected to the printer apparatus in addition to the above-described external memory 160. The plurality of memories may be an option card, or an external memory storing programs that interpret printer control languages different in language systems, in addition to built-in fonts. Moreover, the printer apparatus 150 may include an NVRAM (not illustrated), and printer mode setting information input from the operation unit 159 may be stored therein.

Figure 2:
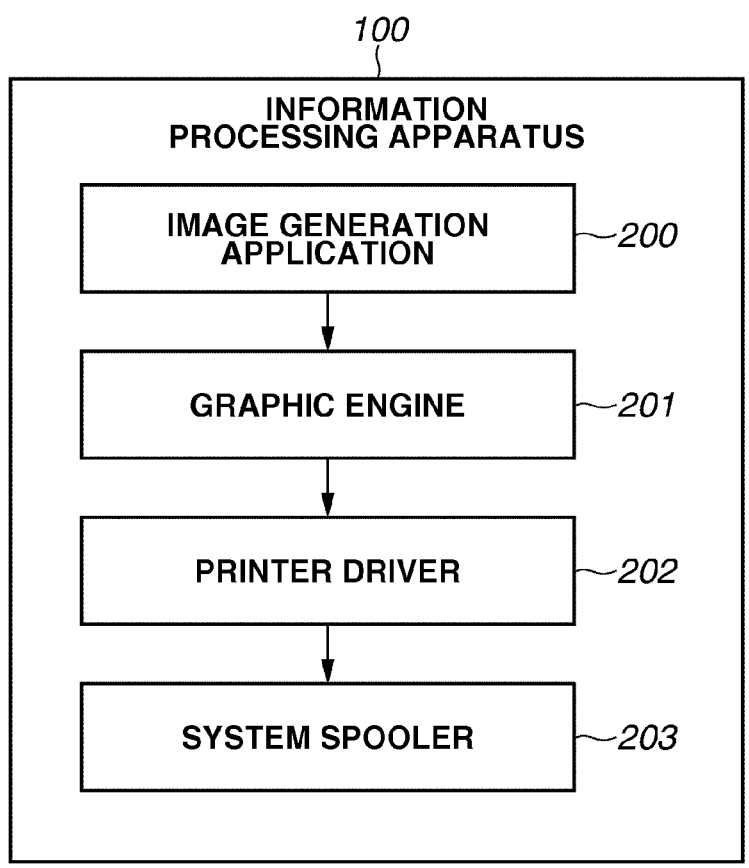
FIG. 2 illustrates a configuration of software relating to print processing in an information processing apparatus.

FIG. 2 illustrates an example of configuration of software relating to the print processing in the information processing apparatus 100.

In FIG. 2, an image generation application 200 has a function for generating original document to be printed. The image generation application 200, when printing is performed on the printer apparatus, utilizes a graphic engine 201, and outputs the image data to the printer driver 202.

The graphic engine 201 has a function for relaying the image data output from the image generation application 200 to the printer driver 202. In Windows (registered trademark) OS, the graphic engine 201 corresponds to a rendering means of the OS termed graphics device interface (GDI).

The printer driver 202 has a function for generating print data composed of control commands, which the printer apparatus 150 can recognize, from the image data received from the graphic engine 201, and for outputting it to a system spooler 203.

The system spooler 203 has a function for outputting print data generated by the printer driver 202 to the printer apparatus 150 via the bidirectional interface. The software is stored in the external memory 111 of the information processing apparatus 100, and is loaded on the RAM 102, when the software is activated. Then, the software is executed by the CPU 101.

Figure 3:
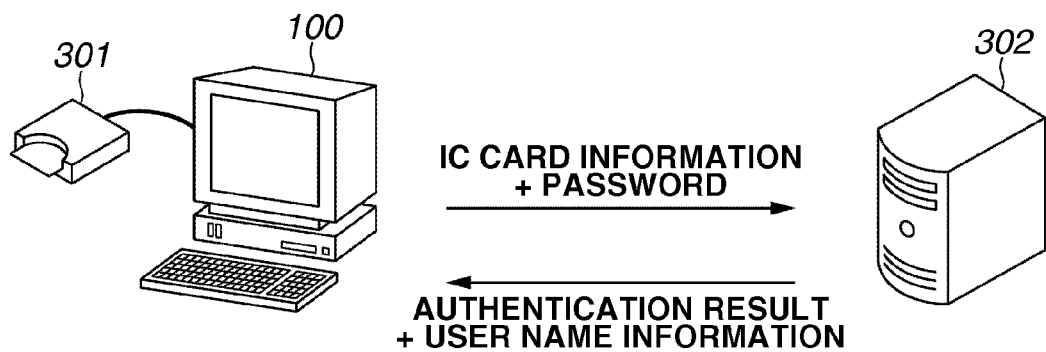
FIG. 3 illustrates basic processing when user authentication is performed.

FIG. 3 illustrates an example of basic processing, when a user authentication is performed. Here, a basic system in which an information processing apparatus 100 of a user and an authentication server 302 perform processing for user authentication using the IC card will be described as an example.

First, a user inserts the user's IC card into an IC card reader 301, and enters a password into the information processing apparatus 100. The information processing apparatus 100 transmits the IC card information read out by the IC card reader 301, and the password which the user has entered into the information processing apparatus 100, to the authentication server 302 via a bidirectional interface such as a network, and requests for authentication of the user.

The authentication server 302 performs user authentication, based on the IC card information and the password transmitted from the information processing apparatus 100, and information managed by the authentication server 302, and sends back a result of the user authentication and the user authentication information to the information processing apparatus 100. If the result of the authentication is OK, utilization of the system by the user is permitted according to information described in the user authentication information.

In the user authentication information, authority information such as type of application which the user of the IC card is allowed to use, and user name information for identifying the user are included. On the other hand, if a result of the authentication is NG, utilization of the system is not permitted to the user.

Figure 4:
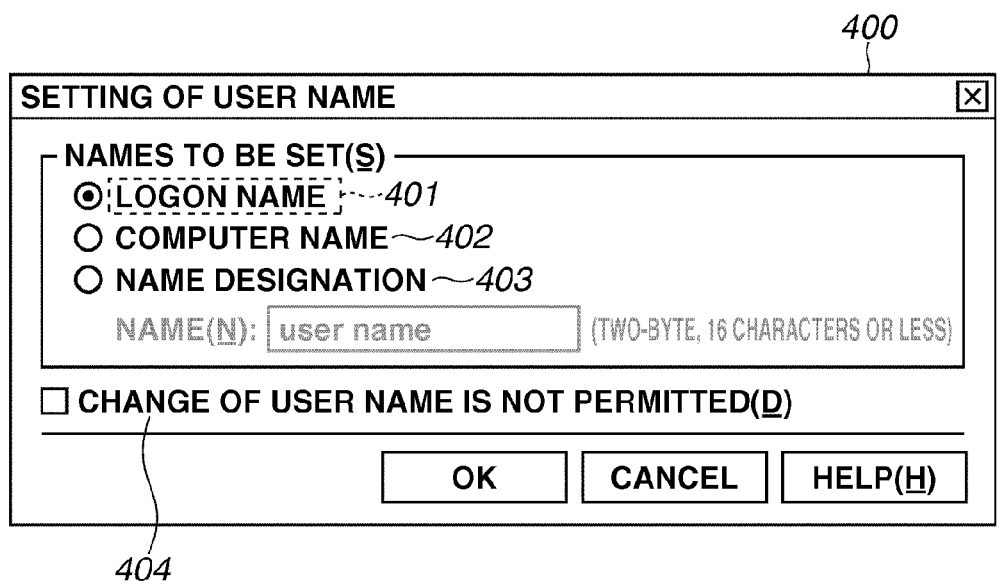
FIG. 4 illustrates a user interface (UI) of a printer driver.

FIG. 4 illustrates an example of a UI of the printer driver 202. More specifically, FIG. 4 is a setting screen of "user name information" ("setting of user name" UI) sent to the printer apparatus 150 together with the print data. By extracting the user name information by the printer apparatus 150 or the print server on the way thereto, management of the user that performs printing becomes possible.

In a "setting of user name" UI 400, what information is to be output together with the print data as the user name information is set. As the types of the user name information, a "logon name" 401, a "computer name" 402, and a "name designation" 403 are provided, and the user will select either one of them.

If the "logon name" 401 is selected, the login name of the user that performs printing is acquired from the system and taken as the user name information. If the "computer name" 402 is selected, the computer name registered on the information processing apparatus 100 which the user uses, is acquired from the system, and taken as the user name information.

If the "name designation" 403 is selected, arbitrary characters with two-byte within 16 characters can be input, and the input character string is taken as the user name information. In accordance with the setting in the "setting of user name" UI 400, the user name information is acquired at the time of generation of the print data, and will be output to the printer apparatus 150 as a predetermined parameter of a user name information setting command.

Further, if a check box of "change of user name is not permitted" 404 is ON in the "setting of user name" UI 400, the person who can change the name to be set as the user name is limited to a person who has an administrator authority for the printer apparatus 150.

If the setting as described above is made in the "setting of user name" UI 400, the printer driver 202 can include the user name information set in the generated print data. The user name information is extracted in the process (e.g., print server) until the user name information reaches the printer apparatus 150 or the printer apparatus 150, and management of the user that performs printing is carried out.

If performed as described with reference to FIG. 3 and FIG. 4, the user authentication information to be used in the authentication system (authentication server 302) and the user name information which the printer driver 202 adds to the print data cannot at all cooperate with each other.

Thus, in the present exemplary embodiment, the user authentication information and the user name information are caused to cooperate with each other in a manner as described below.

Figure 5:
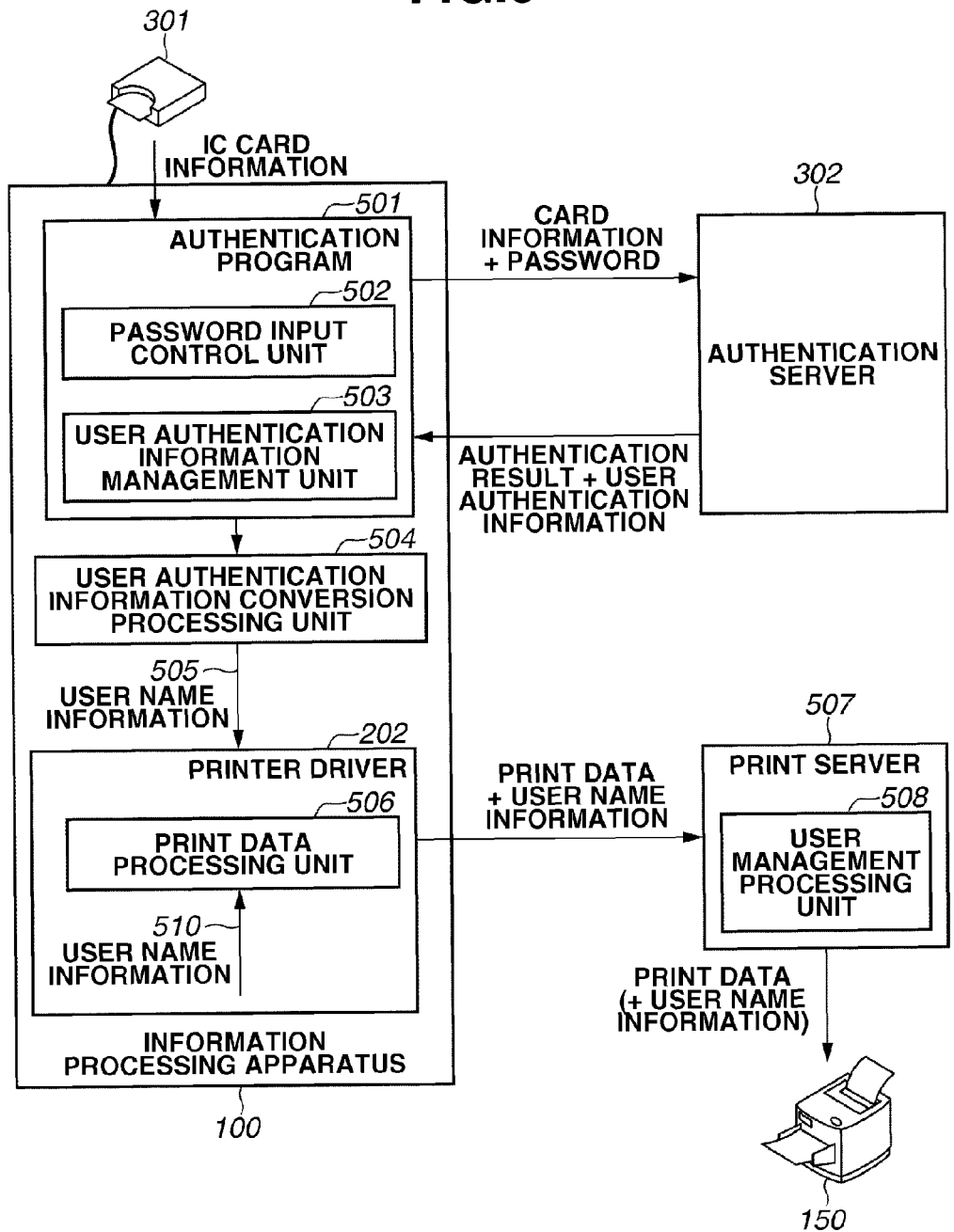
FIG. 5 is a block diagram illustrating an authentication operation and a printing operation in the printing system.

FIG. 5 illustrates an example of authentication operation and print operation in the printing system.

When the IC card is inserted into the IC card reader 301 connected to the information processing apparatus 100, an authentication program 501 stored in the external memory 111 of the information processing apparatus 100 starts operating. The authentication program 501 executes processing for transmitting a password entered by a password input control unit 502, and IC card information read out from the IC card to the authentication server 302.

The authentication server 302 performs the user authentication based on the IC card information and the password transmitted from the information processing apparatus 100, and information managed by the authentication server 302, and sends back a result of the user authentication, and the user authentication information relating to authenticated user to the information processing apparatus 100. The result of the user authentication and the user authentication information sent back from the authentication server 302 are managed by the user authentication information management unit 503 of the authentication program 501.

In a case where only the result of the user authentication is transmitted from the authentication server 302 to the information processing apparatus 100, the authentication program 501 may extract the user name information from the IC card information, and the extracted user name information may be managed by the user authentication information management unit 503.

A user authentication information conversion processing unit 504 can convert a format of information so that the user authentication information managed by the user authentication information management unit 503 can be referred to by the printer driver 202. The user authentication information conversion processing unit 504 extracts the user name information from the user authentication information managed by the user authentication information management unit 503, and generates the user name information 505 which can be referred to by the printer driver 202, based on the user name information.

The format of the user name information 505 is the one that has been determined in advance by the printer driver 202. When the user name information 505 is generated, validity condition or the like of the user name information for the user name information may be available. If the user authentication information managed by the user authentication information management unit 503 has the same format as that of the user name information 505 which can be referred to by the printer driver 202, processing by the user authentication information conversion processing unit 504 becomes unnecessary.

The print data processing unit 506 of the printer driver 202 determines the user name information to be used from among the user name information 505 generated by the user authentication information conversion processing unit 504, and the user name information 510 which has been set in the "setting of user name" UI 400 of the printer driver 202.

Then, the print data processing unit 506 generates the print data having the user name information added thereto The print data processing unit 506 transmits the print data having the user name information added thereto, to the print server 507, and extracts the user name information from the print data using the user management processing unit 508 of the print server 507, and performs management of users which have issued the instruction to execute print operation.

If printing is executed, the print data is transferred from the print server 507 to the printer apparatus 150, and printing is executed by the printer apparatus 150 based on the print data.

To perform user management using the print server 507 is an example. A system may be configured in such a manner that the printer apparatus 150 is also provided with the IC card reader, and printing is executed if the user name information contained in the IC card which the user has presented, and the user name information added to the print data coincide with each other.

If the user name information contained in the IC card which the user has presented and the user name information added to the print data do not coincide with each other, the printer apparatus 150 displays a warning message relating to the fact to notify the user, and may interrupt or discontinue the print operation.

Figure 6:
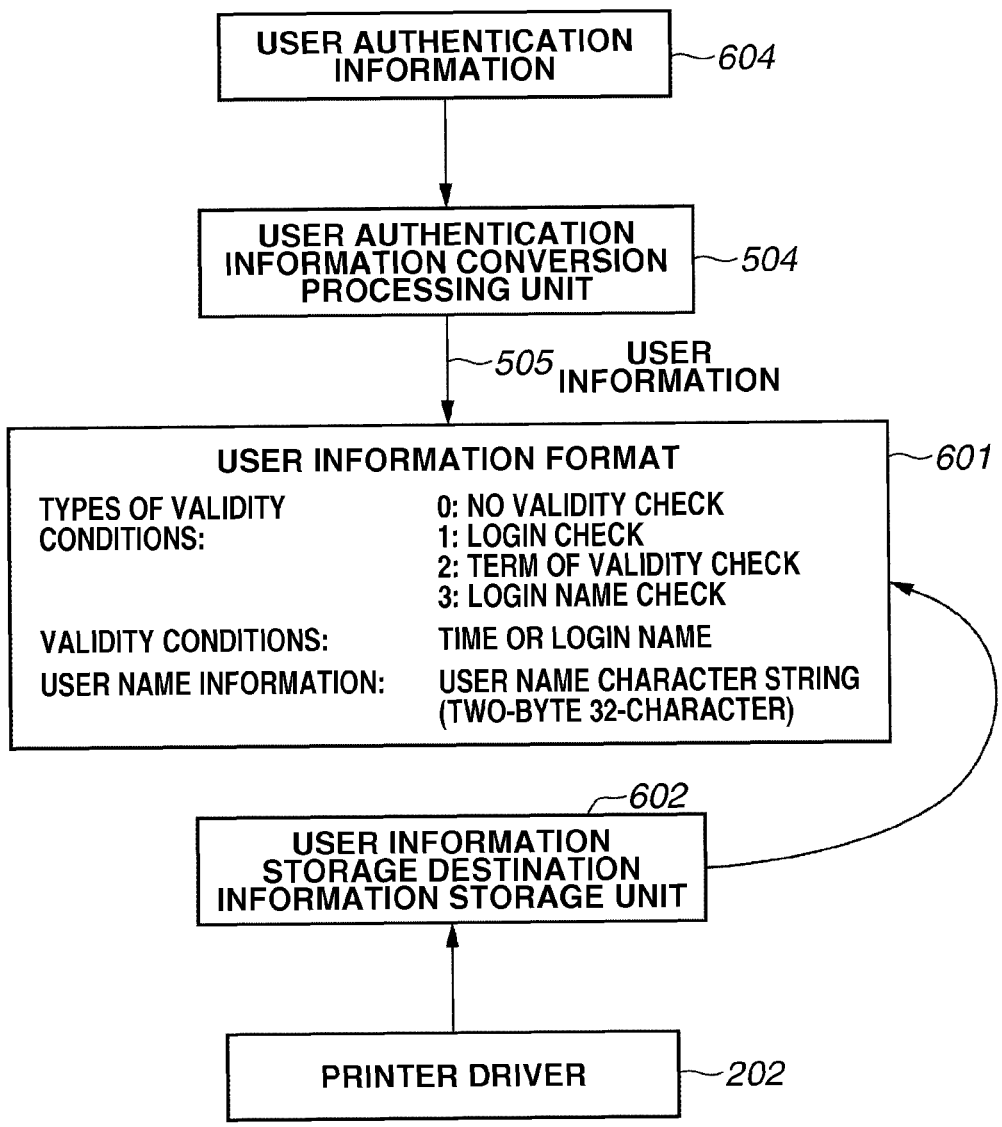
FIG. 6 illustrates a mechanism for acquiring user name information from user authentication information.

FIG. 6 illustrates a mechanism in which the printer driver 202 acquires the user name information to be added to the print data from the user authentication information determined by the authentication server 302.

The user authentication information 604 managed by the user authentication information management unit 503 is converted into the format predetermined by the printer driver 202 as illustrated in the user information format 601, by the above-described user authentication information conversion processing unit 504. The user authentication information conversion processing unit 504 may be provided as a portion that constitutes the printer driver 202, and may be provided for each authentication system that is combined with the printer driver 202, for realizing cooperation with various authentication systems.

Further, if the authentication system to be combined with the printer driver 202 can directly generate the user name information 505 in the user information format 601 predetermined by the printer driver 202, processing by the user authentication information conversion processing unit 504 becomes unnecessary.

Described above is the processing for acquiring the user authentication information 604 as an example of the authentication information of the printer driver 202. The user name information 505 as an example of the user information is formed according to the acquired information. As a matter of course, the user authentication information 604 and the user name information 505 may be identical or substantially identical.

The printer driver 202, when determining the user name information to be added to the print data, refers to the predetermined user information storage destination information holding unit 602. If a file name (path+file name) of a storage destination of the user name information 505 or a registry region name which the OS manages is described, the printer driver 202 refers to the predetermined location and acquires the user name information 505.

Processing for determining the user name information to be included in the print data will be described below. The user information format 601 is to be defined in advance by the printer driver 202 side. Accordingly, it becomes possible to correctly refer to the user name information 505 by the printer driver 202.

The user information format 601 is composed of a method for checking validity (types of validity conditions) and data for checking (validity conditions), in addition to the user name character string corresponding to the user name information within the user authentication information.

If "0" is described as the type of validity condition, a check for validity of the user name information is not performed (no validity check). If "1" is described as the type of validity condition, a login time, and a user information authentication time described as the validity condition are compared, and only if determined as authentication after logging in, the user name information is determined to be valid (login check).

If "2" is described as the type of validity condition, a current time, and a time described as the validity condition are compared. Only if the current time is earlier than the described time, the user name information is determined to be valid (term of validity check). If "3" is described as the type of validity condition, a login name of a user is acquired from the printer driver 202 or the OS. Only if the acquired login name coincides with the login name described as the validity condition, the user name information is determined to be valid (login name check).

In this process, the user information format 601 identifies a method for checking validity of the user name information for the user name character strings. In other words, in the present exemplary embodiment, types of validity conditions and validity conditions are included in the user name information, as an example of information relating to the condition for the user name information to be valid.

However, the user information format 601 may be any format as long as the user name information can be referred to and identified by the printer driver 202. The user information storage destination information holding unit 602, and "path+file" name or a registry region name indicated therein can be referred to from the printer driver 202.

Figure 8:
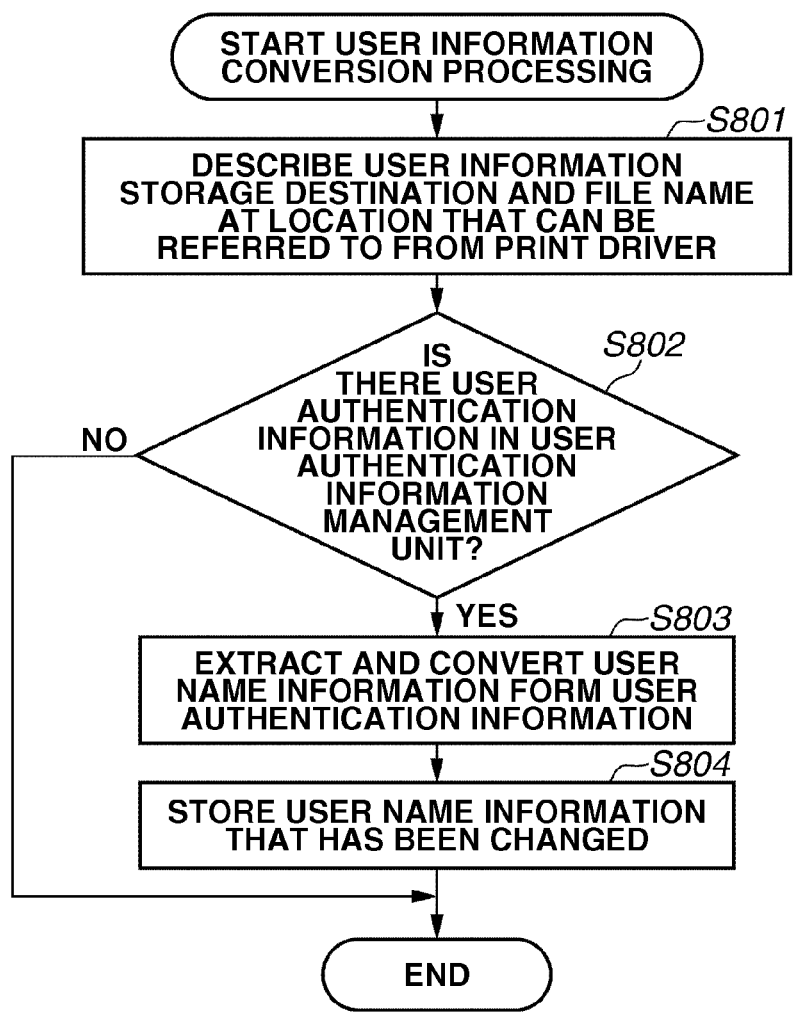
FIG. 8 is a flowchart illustrating user information conversion processing.
Figure 9B:
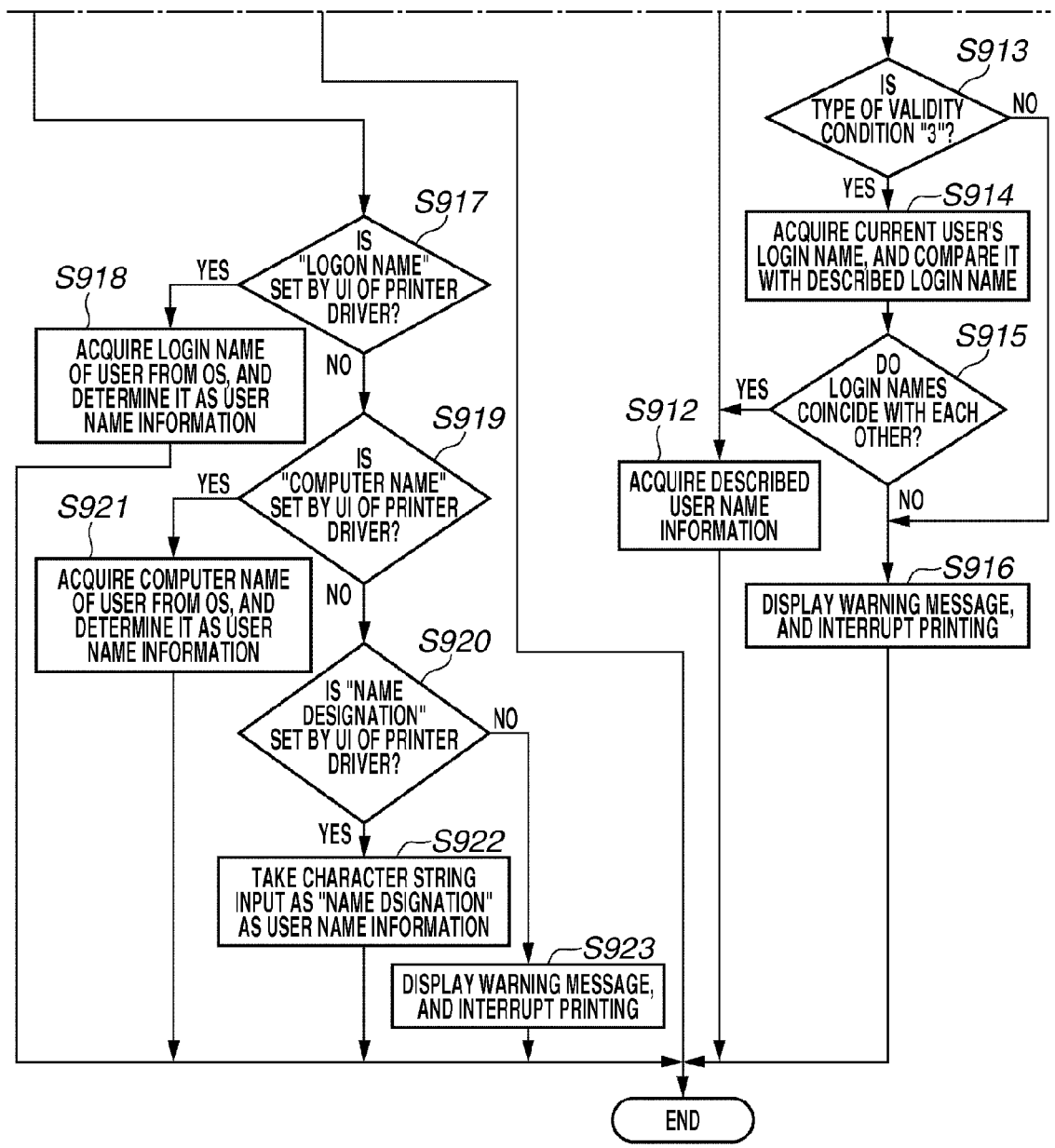
FIG. 9 (9A, 9B) is a flowchart illustrating user name information determination processing.

Next, referring to flowcharts in FIGS. 7 to 9, an example of processing of the printing system will be described.

Figure 7:
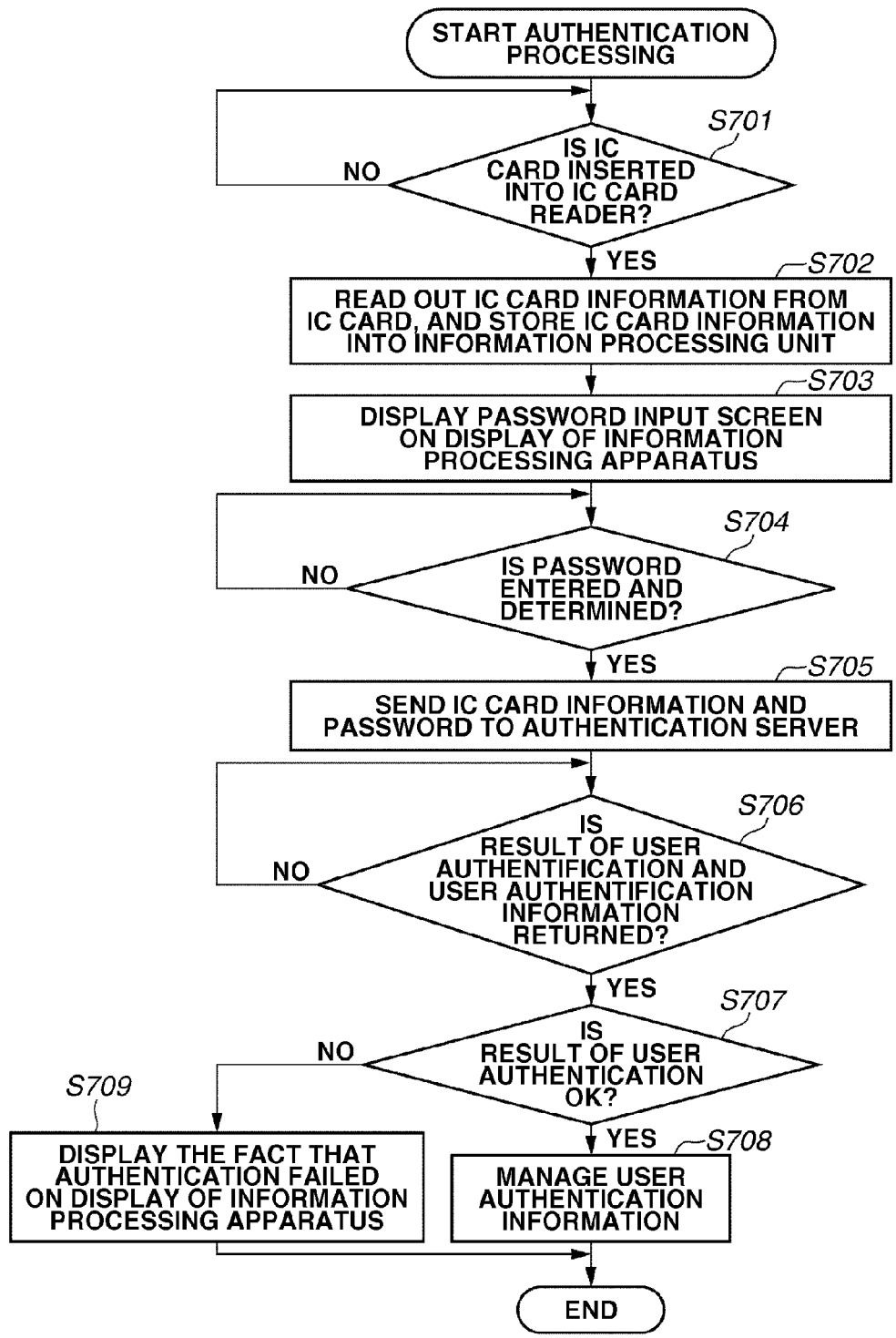
FIG. 7 is a flowchart illustrating authentication processing.

With reference to FIG. 7, an example of processing (authentication processing) in which the authentication server 302 performs user authentication, and the information processing apparatus 100 acquires a result of the user authentication and the user authentication information, will be described.

First, in step S701, an authentication program 501 of the information processing apparatus 100 stands by until the IC card is inserted into the IC card reader 301. When the IC card is inserted into the IC card reader 301, then in step S702, the authentication program 501 (password input control unit 502) of the information processing apparatus 100 reads out IC card information from the IC card reader 301, and stores the IC card information in the information processing apparatus 100.

When acquisition processing of the IC card information is completed, then in step S703, the authentication program 501 of the information processing apparatus 100 causes the CRT 110 (display of the information processing apparatus 100) to display a password input screen, which prompts entry of password.

Then, in step S704, the authentication program 501 of the information processing apparatus 100 stands by until the password is entered into the password input screen, and determined. When the password is determined, then in step S705, the authentication program 501 of the information processing apparatus 100 performs processing for transmitting the IC card information and the password to the authentication server 302.

The authentication server 302 performs user authentication based on the IC card information and the password acquired from the information processing apparatus 100, and information managed by the authentication server 302, and sends back a result of the user authentication and the user authentication information to the information processing apparatus 100. In step S706, the authentication program 501 of the information processing apparatus 100 stands by until the result of the user authentication and the user authentication information is sent back from the authentication server 302.

When the result of the user authentication and the user authentication information are sent back, then in step S707, the authentication program 501 of the information processing apparatus 100, first, determines whether a result of the user authentication is OK. If a result of the user authentication is OK, as the result of the determination (YES in step S707), then in step S708, the authentication program 501 of the information processing apparatus 100 (the user authentication information management unit 503) manages (stores) the returned user authentication information. On the other hand, if a result of the user authentication is NG (NO instep S707), then in step S709, the authentication program 501 of the information processing apparatus 100 causes the CRT 110 (display of the information processing apparatus 100) to display information indicating the fact that authentication is failed, and notifies the user of the fact.

Next, with reference to FIG. 8, an example of processing (user information conversion processing) for converting user authentication information into user name information that can be referred to from the printer driver 202 will be described.

First, in step S801, the user authentication information conversion processing unit 504 of the information processing apparatus 100 describes a storage destination and a file name of the user name information in the user information storage destination information holding unit 602 located in a predetermined storage area that can be referred to from the printer driver 202. The storage destination may be predetermined on a program, or the storage destination may be described in a setting file and referred to from the printer driver 202 so that the location can be changed.

In the present exemplary embodiment, a predetermined location which can be referred to from the printer driver 202 is defined as a registry region (HKEY_LOCAL_MACHINE\SOFTWARE¥ABC\JobName). Then, (c:\userinfo\username.dat) is described therein as a storage destination of the user name information.

Next, in step S802, the user authentication information conversion processing unit 504 determines whether there is user authentication information managed by the user authentication information management unit 503 of the authentication program 501. If there is no user authentication information as the result of the determination (NO in step S802), then the processing according to the flowchart in FIG. 8 ends.

On the other hand, if there is user authentication information (YES in step S802), then in step S803, the user authentication information conversion processing unit 504 extracts the user name information from the user authentication information, converts the user name information into a format indicated in the user information format 601. Then, in step S804, the user authentication information conversion processing unit 504 stores the user name information 505 under a designated file name (username.dat) in a location (c:\userinfo\) described as a storage destination of the user information.

Next, an example of processing (user name information determination processing) in which the printer driver 202 determines user name information to be added to the print data will be described with reference to FIG. 9.

First, in step S900, the printer driver 202 determines whether a storage destination of the user name information is described in the user information storage destination information holding unit 602 (HKEY_LOCAL_MACHINE\SOFTWARE\ABC\JobName). If it is determined that the storage destination of the user name information is not described (NO in step S900) as a result the determination, then the printer driver 202 refers to a content set in the "setting of user name" UI 400 (refer to FIG. 4) and acquires the user name information.

Then, instep S917, the printer driver 202 determines whether a "logon name" 401 is set via the "setting of user name" UI 400. If it is determined that the "logon name" 401 is set as a result of the determination (YES in step S917), then in step S918, the printer driver 202 acquires a login name of the user from the OS and determines it as the user name information.

If it is determined that the "logon name" 401 is not set as a result of determination instep S917 (NO in step S917), then in step S919, the printer driver 202 determines whether a "computer name" 402 is set via the "setting of user name" UI 400. If it is determined that the "computer name" 402 is set as a result of the determination (YES in step S917), then in step S921, the printer driver 202 acquires the computer name from the OS and determines it as the user name information.

If it is determined that the "computer name" 402 is not set as a result of the determination in step S919 (NO in step S919), then in step S920, the printer driver 202 determines whether a "name designation" 403 is set via the "setting of user name" UI 400. If it is determined that the "name designation" 403 is set as a result of the determination (YES in step S920), then in step S922, the printer driver 202 determines the character string input as name as the user name information.

On the other hand, if the "name designation" 403 has not been set (NO in step S920), then in step S923, the printer driver 202 displays on the CRT 110 (display of the information processing apparatus 100) a warning message indicating that there is no registration of the user name information, and interrupts (or discontinues) the print processing.

If it is determined that a storage destination of the user name information is described in the user information storage destination information holding unit 602 as a result of the determination in step S900 (YES in step S900), then in step S901, the printer driver 202 refers to a file stored in the storage destination. In this process, the printer driver refers to c:\userinfo\username.dat. Accordingly, the printer driver 202 acquires the user name information contained in user authentication information.

Next, instep S902, the printer driver 202 determines whether a file exists at a storage destination described in the user information storage destination information holding unit 602, and a file format of the file coincides with the predetermined one.

If it is determined that the file does not exist, or the file format is not correct as a result of the determination (NO in step S902), the printer driver 202 determines the user name information obtained in step S901 to be invalid. Then, the processing proceeds to step S917 described above, and the printer driver 202 determines the user name information according to the setting via the "setting of user name" UI 400.

If it is determined that the file exists as a result of the determination in step S902, and the file format is also correct (YES in step S902), the printer driver 202 refers to the type of validity condition from the user name information obtained in step S901, according to the user information format 601. Then, in step S903, the printer driver 202 determines whether "0" is described as the type of validity condition of the user name information obtained in step S901.

If it is determined that "0" is described as the type of validity condition as a result of the determination (YES in step S903), the printer driver 202 does not check the validity condition of the user name information. In other words, in step S904, the printer driver 202 extracts the user name character string from the user name information obtained instep S901 and determines it as the user name information to be added to the print data.

If it is determined that "0" is not described as the type of validity condition as a result of the determination in step S903 (NO in step S903), then in step S905, the printer driver 202 determines whether "1" is described as the type of validity condition of the user name information obtained in step S901.

If it is determined that "1" is described as type of validity condition as a result of the determination (YES in step S905), then in step S906, the printer driver 202 compares an authentication time described as the validity condition in the user name information obtained in step S901, and a login time of the user acquired from the OS.

Then, instep S907, the printer driver 202 determines whether the login time (at the time of login) is earlier than the authentication time (at the time of authentication) described as the validity condition in the user name information. If it is determined that the login time is earlier than the authentication time as a result of the determination (YES in step S907), then in step S904, the printer driver 202, judging that authentication has been performed correctly after the login, extracts the user name character string from the user name information and determines it as the user name information to be added to the print data.

On the other hand, if it is determined that the login information is later than the authentication time as a result of the determination in step S907 (NO in step S907), then in step S908, the printer driver 202 displays a warning message on the CRT 110 (display of the information processing apparatus 100), and interrupts (or discontinues) the print processing.

Warning message is a dialogue described as, for example, "User information currently being set is not valid. Printing will be discontinued".

If it is determined that "1" is not described as the type of validity condition as a result of the determination in step S905 (NO in step S905), then in step S909, the printer driver 202 determines whether "2" is described as the type of validity condition of the user name information obtained in step S901.

If it is determined that "2" is described as type of validity condition as a result of the determination (YES in step S909), then in step S910, the printer driver 202 compares a term of validity described as the validity condition in the user name information obtained in step S901 and a current time acquired from the OS. Then, in step S911, the printer driver 202 determines whether the current time is within the term of validity described as the validity condition in the user name information.

If it is determined that the current time is within the term of validity as a result of the determination (YES in step S911), then in step S912, the printer driver 202 extracts a user name character string from the user name information obtained in step S901, and determines it as the user name information to be added to the print data.

If it is determined that the current time is out of the term of validity as a result of the determination in step S911 (NO in step S911), then in step S908, the printer driver 202 informs the warning message as described above to the user, and interrupts (or discontinues) the print processing.

If it is determined that "2" is not described as the type of validity condition as a result of the determination in step S909 (NO in step S909), then in step S913, the printer driver 202 determines whether "3" is described as the type of validity condition of the user name information obtained in step S901.

If it is determined that "3" is described as the type of validity condition as a result of the determination (YES in step S913), then in step S914, the printer driver 202 compares a login name described as the validity condition in the user name information obtained in step S901, and a login name of the user acquired from the OS. Then, in step S915, the printer driver 202 determines whether the login name described as the validity condition in the user name information, and the login name of the user acquired from the OS coincide with each other.

If it is determined that the login names coincide with each other as a result of the determination (YES in step S915), then in step S912, the printer driver 202 extracts a user name character string from the user name information obtained in step S901, and determines it as the user name information to be added to the print data.

If it is determined that "3" is not described as the type of validity condition as a result of the determination (in a case where a number other than 0 to 3 is designated as the type of validity condition), or it is determined that if the login names do not coincide with each other as a result of the determination in step S915 (NO in step S913), then the processing proceeds to step S916. Then, in step S916, the printer driver 202 displays the warning message as described above on the CRT 110 (display of the information processing apparatus 100), and interrupts (or discontinues) the print processing.

The printer driver 202 describes the user name information to be added to the print data determined in a manner as described above as a parameter of a command for designating a user name (in the present exemplary embodiment, id_at-t_job_owner_name), and outputs it from the printer driver 202 to the printer apparatus 150.

Next, a control to print the print data transmitted to the printer apparatus 150 will be described with reference to FIG. 10.

As described above, when the print data having the user name information added thereto is transmitted from the printer driver 202 (YES in step S1000), then in step S1001, the print data and the user name information are separated from each other in the printer apparatus 150. In step S1002, the separated print data is converted into image data for forming images, and is saved in the external memory 160 in association with the separated user name information.

In step S1003, the printer apparatus 150 stands by until character information is input by the operation unit 159 provided in the printer apparatus 150, or a character input apparatus (not illustrated) connected to the printer apparatus 150, or the IC card reader.

When character information is input, then in step S1004, the printer apparatus 150 checks whether the image data of the user name information that corresponds to the character information is saved in the external memory 160.

If it is determined that there is no image data that corresponds to the character information as a result of the check (NO in step S1004), then in step S1005, the printer apparatus 150 displays a message for notifying the fact that there is no image data that corresponds to the character information on the operation unit 159, and becomes an input waiting state of the user name information. On the other hand, if there is image data that corresponds to the character information (in a case where the image data is saved) (YES in step S1004), then in step S1006, the printer apparatus 150 transfers the image data in order of having been saved in the print unit 158 to execute print operation.

In the present exemplary embodiment, in step S1007, the image data, of which printing is completed, is deleted from the external memory 160. Then, when all image data is printed (YES in step S1008), the print processing ends.

If the character information input in step S1003 and the saved user name information coincide with each other, a list of the image data corresponding to the user name information is displayed on the operation unit 159, and the user may select the image data to be printed.

Further, a screen for selecting whether to delete the image data saved in the external memory 160 at the time of completion of printing is displayed on the operation unit 159, and only if deletion of the image data is selected, the image data may be deleted.

Further, if the user name information is not added to the print data, printing may be executed as it is or printing may not be executed.

As described above, by allowing only the image data that coincides with the user name information among the image data saved with the user name information being input, to be printed, it becomes possible to avoid print product from being left, or being carried away mistakenly by other person.

As described above, in the present exemplary embodiment, the information processing apparatus 100 acquires user name information contained in the user authentication information transmitted from the authentication server 302. Then, the information processing apparatus 100 describes and stores the acquired user name information according to a predetermined format which the printer driver 202 can refer to, in a storage area which the printer driver 202 can refer to.

If the user name information is stored in the storage area, and the user name information is described in the format, the printer driver 202 adds the user name information to the print data, and transmits it to the printer apparatus 150.

Accordingly, it becomes possible to send the user name information contained in the user authentication information acquired from the user authentication system such as the IC card, together with the print data. Hence, it becomes possible to build a system for performing user management or print management using the user authentication information authenticated by the user authentication system.

Further, in the present exemplary embodiment, if user name information is not stored in a storage area which the printer driver 202 can refer to, or the user name information does not satisfy the condition described in the format, the user name information designated by the UI is added to the print data. Therefore, the user name information can be prevented from not being added to the print data.

By adding, as well as user name information, types of validity conditions and validity conditions used for determining validity of the user name information to the print data, validity of the user name information may be checked again at the time of print execution at the printer apparatus 150, for example.

Further, if the user name information obtained from the user authentication information does not satisfy validity conditions (e.g., if determined as "NO" in steps S905, S909, or in step S913), the user name information may be determined according to the setting of the "setting of user name" UI 400.

Moreover, if a file format that exists in a storage destination described in the user information storage destination information holding unit 602 does not coincide with the predetermined one, then upon displaying a warning message concerning the fact, the print processing may be interrupted (or discontinued).

Next, a second exemplary embodiment of the present invention will be described. A different point of the present exemplary embodiment from the first exemplary embodiment is that a function of notifying the user via a pop-up UI of the user name information to be added to the print data is added, before the printer driver 202 adds the determined user name information to the print data, after having determined the user name information (FIG. 9).

Figure 10:
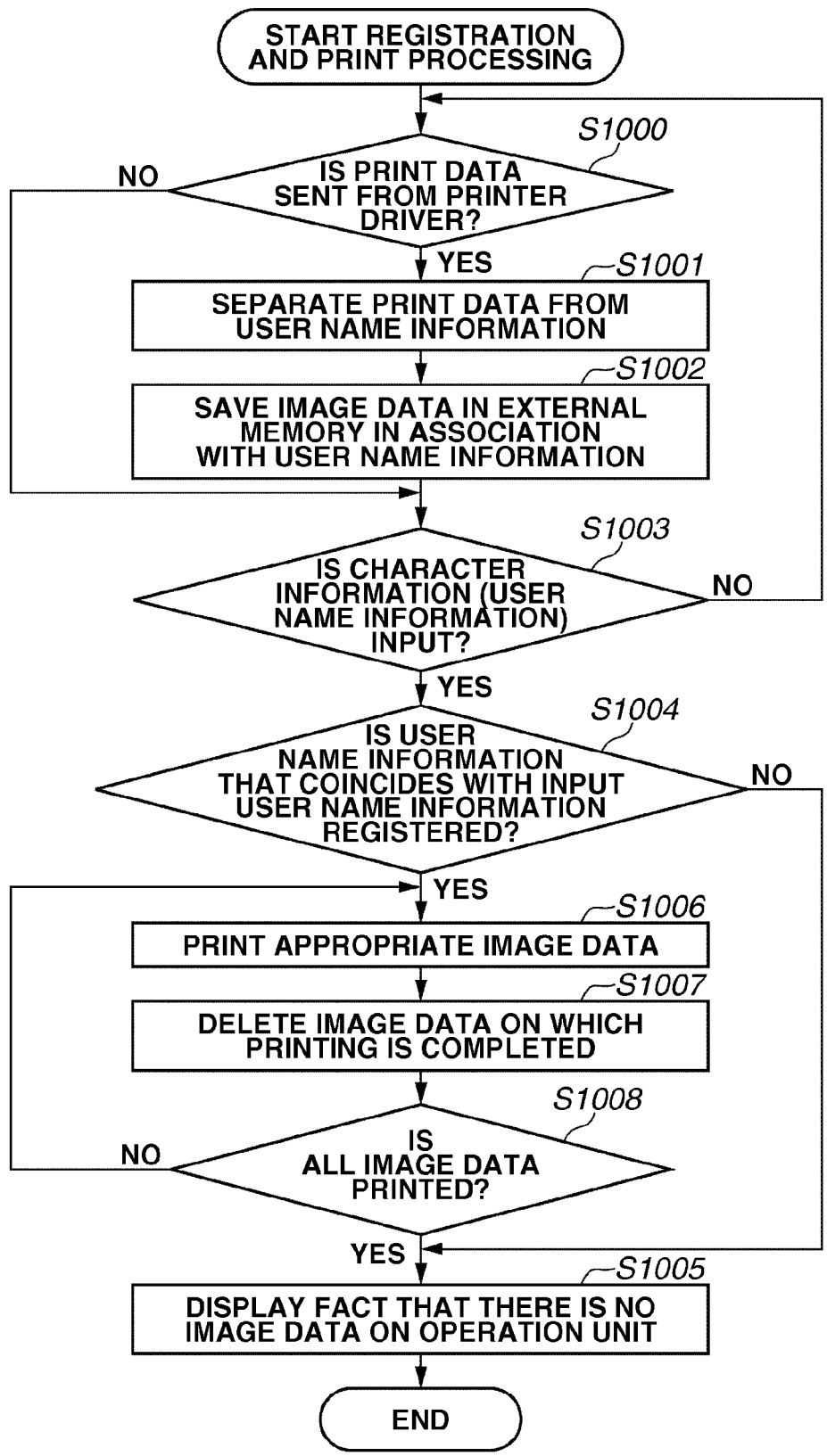
FIG. 10 is a flowchart illustrating print data registration and print processing on the printer apparatus.

Therefore, in the description of the present exemplary embodiment, to the same elements and parts as those illustrated in FIG. 1 (1A, 1B) to FIG. 10, the same numerals are assigned in the present exemplary embodiment, and detailed descriptions thereof will not be repeated.

Figure 11:
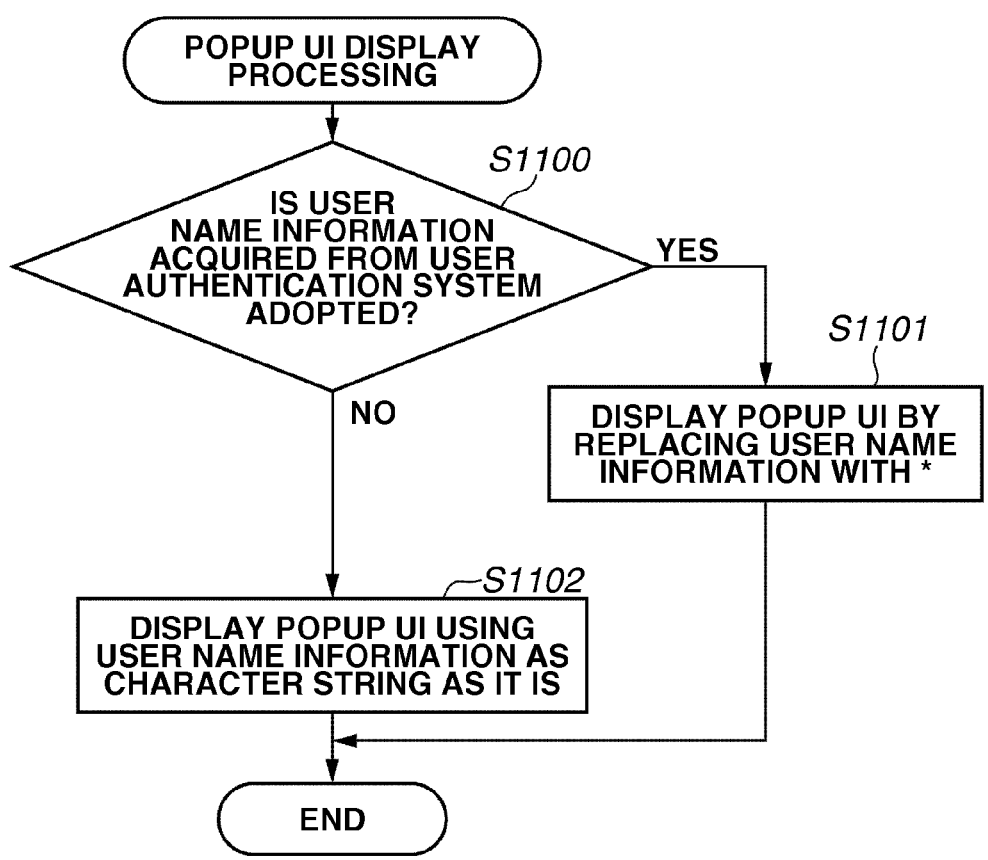
FIG. 11 is a flowchart illustrating a pop-up UI display processing of the user name information.

FIG. 11 is a flowchart illustrating an example of processing (pop-up UI display processing) for pop-up displaying the user name information to be added to the print data. Further, FIG. 12 illustrates a display example of the pop-up UI. In the present exemplary embodiment, the flowchart in FIG. 11 is to be executed, after user name information to be added to the print data is determined according to the flowchart illustrated in FIG. 9, before the user name information is added to the print data.

First, in step S1100, the printer driver 202 determines whether the user name information to be added to the print data is the user name information acquired from the user authentication system such as the IC card. If it is determined that the user name information to be added to the print data is the user name information acquired from the user authentication system as a result of the determination (YES in step S1100), then in step S1101, the printer driver 202 displays the user name information that is replaced with a specified character on the display of the information processing apparatus 100.

Figure 12A:
FIGS. 12A and 12B each illustrate a pop-up UI display example of the user name information.

FIG. 12A illustrates a display example of the pop-up UI of the user name information in a case where the user name information to be added to the print data is the user name information acquired from the user authentication system. As illustrated in FIG. 12A, in the present exemplary embodiment, a case where the user name information is replaced with a character "*" is taken as an example. However, the character to be replaced may be another character string such as "user name of user authentication system".

On the other hand, if the user name information to be added to the print data is not the user name information acquired from the user authentication system, but is the user name information set in the "logon name" 401, the "computer name" 402, or the "name designation" 403 illustrated in FIG. 4, the following processing will be performed. That is, instep S1102, the printer driver 202 displays the user name information on the display of the information processing apparatus 100 as it is.

Figure 12B:

FIG. 12B illustrates a display example of the pop-up UI of the user name information, in a case where the user name information to be added to the print data is the user name information set via the "setting of user name" UI.

The reason why a display method of the pop-up UI is varied depending on an acquisition destination of the user name information as described above is that there is some cases where the user identification information used in the user authentication system should not be disclosed to the user.

In the present exemplary embodiment, the user name information to be used for authentication is not disclosed by replacing only the user name information given from the outside with specified character (a symbol "*" in the example illustrated in FIG. 12A). However, with respect to the "logon name" 401, the "computer name" 402 acquired from the OS, a display may be also performed by replacing them with the specified character. Like this, determination of the user information to be replaced with the specified character may be selectively performed.

Further, determination whether to permit a change of the user name information on the pop-up UI illustrated in FIGS. 12A and 12B is performed according to the setting of the "change of user name is not permitted" 404 illustrated in FIG. 4. However, regardless of the setting, in a case of the user name information acquired from the user authentication system such as the IC card, the change of the user name information on the pop-up UI may be always prohibited.

Next, a third exemplary embodiment of the present invention will be described. In the first and the second exemplary embodiments, the user name information to be added to the print data is to be notified as a parameter of a command of "id_att_job_owner_name". This is because, if there is no such information, even with the same user name information, e.g., "abcde", the reliability thereof cannot be discriminated.

Compared with the above described case, in the present exemplary embodiment, the printer driver 202 has a function for adding not only user name information, but also information based on which a destination (acquisition destination) of having obtained the user name information can be identified, and information indicating reliability of the user name information, to the print data. Therefore, in descriptions of the present exemplary embodiment, to the same elements and parts in the present exemplary embodiment as those illustrated in FIGS. 1 to 12 according to the first and the second exemplary embodiments, the same numerals are assigned, and the detailed descriptions thereof will not be repeated.

Figure 13:
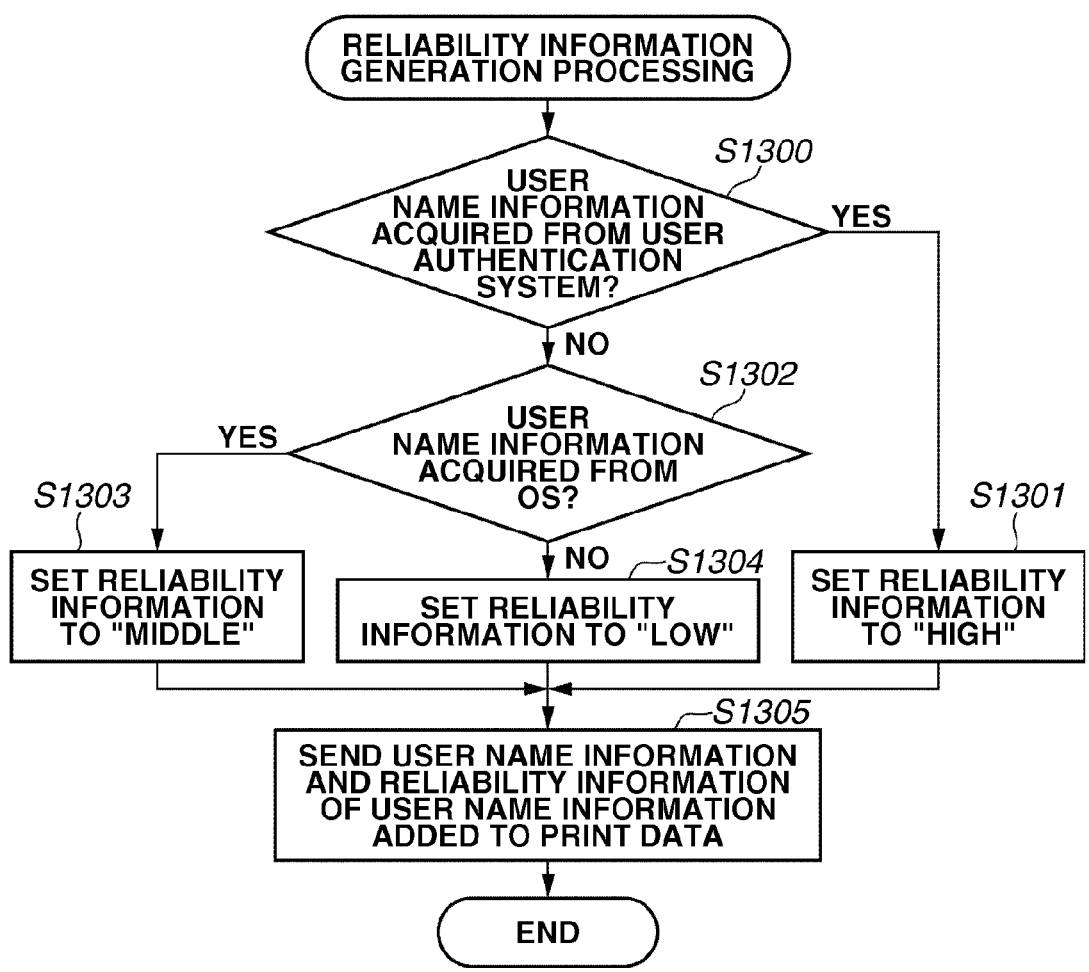
FIG. 13 is a flowchart illustrating reliability information generation processing of the user name information.

FIG. 13 is a flowchart illustrating an example of processing (reliability information generation processing) for generating, according to the user name information, reliability information indicating reliability of the user name information.

In step S1300, the printer driver 202 determines whether to transmit the user name information, which is acquired from the user authentication system such as the IC card and without change as it is, added to the print data.

If it is determined that the user name information acquired from the user authentication system is added to the print data as it is as the user name information as a result of the determination (in a case where the user name information is information acquired from the user authentication system) (YES in step S1300), the following processing is performed. That is, in step S1301, the printer driver 202, regarding that reliability of the user name information is high, sets reliability information to "high".

On the other hand, if the user name information acquired from the user authentication system is not added to the print data as it is as the user name information (NO in step S1300), the following processing is performed. That is, instep S1302, the printer driver 202 determines whether to transmit information acquired from the OS as it is without change as the user name information, like the "logon name" 401, the "computer name" 402 illustrated in FIG. 4, with the information added to the print data.

If it is determined that the user name information acquired from the OS is added to the print data as it is as the user name information as a result of the determination (if the user name information is information acquired from the OS) (YES in step S1302), the following processing is performed. That is, in step S1303, the printer driver 202, regarding that reliability of the user name information is medium degree, sets reliability information to "middle".

On the other hand, if the user name information acquired from the OS is not added to the print data as it is as the user name information (NO in step S1302), then in step S1304, the printer driver 202, regarding that reliability of the user name information is low, sets reliability information to be "low". A case where the processing of step S1304 is performed is a case where, for example, the user name information to be added to the print data is the user name information set via the "name designation" 403 illustrated in FIG. 4, or the user name information changed by the user on the pop-up UI illustrated in FIG. 12.

As described above, when reliability information is determined, the printer driver 202 adds the determined reliability information and the user name information to the print data. Then, in step S1305, the information processing apparatus 100 transmits the print data having reliability information and the user name information added thereto to the print server 507.

Further, if information based on which obtaining destination (acquisition destination) of the user name information can be identified is added to the print data, the following processing is performed. That is, the printer driver 202 determines, for example, an obtaining destination of the user name information is the user authentication system, the OS, or other than them. Then the printer driver 202 adds the information indicating the determined obtaining destination, as an example of the user information acquisition destination information, to the print data together with the user name information.

The above-described exemplary embodiments are just illustrations of example embodiments for implementing the present invention, and technical scope of the present invention shall not be construed by these embodiments in a limited manner. The present invention can be implemented in various forms without deviating from technical ideas, or main features thereof.

According to the present invention, the user information formed using the authentication information to be used in an authentication system other than an authentication system compatible with an operating system that controls the information processing apparatus can be added to the print data by the printer driver.

The various aspects of the present invention can also be realized by a computer of a system or apparatus (or devices such as a CPU or micro-processing unit (MPU)) that reads out and executes a program of computer executable instructions recorded on a memory device to perform the functions of the above-described embodiments, and by a method, the steps of which are performed by a computer of a system or apparatus by, for example, reading out and executing the program recorded on a memory device to perform the functions of the above-described embodiments. For this purpose, the program can be provided to the computer for example via a network or from a recording medium of various types serving as the memory device (e.g., computer-readable storage medium). In such a case, the system or apparatus, and the recording medium where the program is stored, are included as being within the scope of the present invention. Any of a wide variety of computer-readable storage media may be used. For example, the computer-readable storage medium may be any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-252280 filed Nov. 2, 2009 and No. 2010-091574 filed Apr. 12, 2010, which are hereby incorporated by reference herein in their entirety.

What is claimed is:

1. An authentication method of an information processing apparatus capable of storing a printer driver generating print data, comprising:
   determining whether first user information is stored in a predetermined storage area, wherein the first user information is transmitted from an external apparatus;
   determining, when the first user information is stored in the predetermined storage area, the first user information as user information to be added to the print data, and determining, when the first user information is not stored in the predetermined storage area, second user information based on setting information set using a setting screen of the printer driver as the user information to be added to the print data;
   displaying, when the first user information is determined as the user information to be added to the print data, a first user information confirmation screen not to receive a change of the user information, and displaying, when the second user information is determined as the user information to be added to the print data, a second user information confirmation screen to receive the change of the user information; and
   transmitting the print data to which the first or second user information has been added to a printing apparatus.

2. The authentication method according to claim 1, wherein if the printer driver adds either the second user information designated by the user or the first user information stored in the predetermined storage area to the print data, the printer driver adds to the print data user information acquisition destination information indicating an acquisition destination of the user information.

3. The authentication method according to claim 1, wherein the printer driver, if either the second user information or first user information is added to the print data, discriminates reliability of the user information based on an acquisition destination of the user information, and adds information indicating the reliability to the print data.

4. A computer-readable storage medium storing a program of instructions, the program of instructions executable by an information processing apparatus to perform a method capable of storing a printer driver generating print data, the method comprising:
   determining whether first user information is stored in a predetermined storage area, wherein the first user information is transmitted from an external apparatus;
   determining, when the first user information is stored in the predetermined storage area, the first user information as user information to be added to the print data, and determining, when the first user information is not stored in the predetermined storage area, second user information based on setting information set using a setting screen of the printer driver as the user information to be added to the print data;
   displaying, when the first user information is determined as the user information to be added to the print data, a first user information confirmation screen not to receive a change of the user information, and displaying, when the second user information is determined as the user information to be added to the print data, a second user information confirmation screen to receive the change of the user information; and
   transmitting the print data to which the first or second user information has been added to a printing apparatus.

5. The computer-readable storage medium according to claim 4, wherein if the printer driver adds either the second user information designated by the user or the first user information stored in the predetermined storage area to the print data, the printer driver adds to the print data user information acquisition destination information indicating an acquisition destination of the user information.

6. The computer-readable storage medium according to claim 4, wherein the printer driver, if either the second user information or first user information is added to the print data, discriminates reliability of the user information based on an acquisition destination of the user information, and adds information indicating the reliability to the print data.

* * * * *